(12) United States Patent
Stevens et al.

(10) Patent No.: US 7,464,073 B2
(45) Date of Patent: Dec. 9, 2008

(54) APPLICATION OF QUERIES AGAINST INCOMPLETE SCHEMAS

(75) Inventors: Richard J. Stevens, Mantorville, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 10/411,450

(22) Filed: Apr. 10, 2003

(65) Prior Publication Data

US 2004/0205050 A1    Oct. 14, 2004

(51) Int. Cl.
*G06F 7/00*    (2006.01)
(52) U.S. Cl. .................. 707/3; 707/5; 707/100
(58) Field of Classification Search .......... 707/4, 707/3, 5, 100
See application file for complete search history.

(56) References Cited

U.S. PATENT DOCUMENTS

| | | | | |
|---|---|---|---|---|
| 6,289,334 B1 * | 9/2001 | Reiner et al. | ............... | 707/3 |
| 6,338,055 B1 * | 1/2002 | Hagmann et al. | ............... | 707/2 |
| 6,341,281 B1 * | 1/2002 | MacNicol et al. | ............... | 707/3 |
| 6,353,830 B1 * | 3/2002 | Yee et al. | ............... | 707/102 |
| 6,411,950 B1 * | 6/2002 | Moricz et al. | ............... | 707/3 |
| 6,430,556 B1 * | 8/2002 | Goldberg et al. | ............... | 707/4 |
| 6,609,123 B1 * | 8/2003 | Cazemier et al. | ............... | 707/4 |
| 6,631,371 B1 * | 10/2003 | Lei et al. | ............... | 707/4 |

\* cited by examiner

*Primary Examiner*—Pierre M. Vital
*Assistant Examiner*—Mahesh H Dwivedi
(74) *Attorney, Agent, or Firm*—Patterson & Sheridan

(57) ABSTRACT

An improved method, system, and article of manufacture for issuing a query against multiple data sources that may not each contain all the fields involved in the query is provided. A diverse query targeting the multiple data sources may be decomposed into individual query predicates. For each data source, an effective query may be generated by removing, from the diverse query, individual predicates involving fields not contained in the data source. Partial results received in response to issuing the effective queries against their corresponding data sources may be merged using any suitable technique.

22 Claims, 9 Drawing Sheets

DATA ABSTRACTION MODEL

| SOURCE = "DIAGNOSTIC RECORDS" | SOURCE = "TEST RECORDS" | SOURCE = "PATIENT RECORDS" |
|---|---|---|
| Field Name = "Patient ID"<br>Table = "contact"<br>Column = "pat_id" | Field Name = "Patient ID"<br>Table = "contact"<br>Column = "pat_id" | Field Name = "Patient ID"<br>Table = "contact"<br>Column = "pat_id" |
| Field Name = "Gender"<br>Table = "contact"<br>Column = "gender" | Field Name = "Gender"<br>Table = "contact"<br>Column = "gender" | Field Name = "Gender"<br>Table = "contact"<br>Column = "gender" |
| Field Name = "Diagnosis"<br>Table = "medical"<br>Column = "diag" | Field Name = "Test Results"<br>Table = "tests"<br>Column = "results" | Field Name = "Birthdate"<br>Table = "demographic"<br>Column = "d.o.b" |

*FIG. 2D*

APPLICATION OF QUERIES AGAINST INCOMPLETE SCHEMAS

CROSS RELATED APPLICATIONS

The present invention is related to the commonly owned, co-pending application Ser. No. 10/083,075, entitled "Improved Application Portability And Extensibility Through Database Schema And Query Abstraction," filed Feb. 26, 2002.

BACKGROUND OF THE INVENTION

1. Field of the Invention

The present invention generally relates to data processing and more particularly to issuing a query against at least one database that may not contain all the data entities involved in the query.

2. Description of the Related Art

Databases are computerized information storage and retrieval systems. A relational database management system (RDBMS) is a database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update data, and so forth.

With advances in information technology (IT), the data accessible by queries becomes more distributed and diversified (i.e., located on more than one database). For example, a patient's records (diagnosis, treatment, etc.) may be stored in one database, while clinical trial information relating to a drug used to treat the patient may be stored in another database. Accordingly, it is becoming increasingly necessary to access data from multiple databases and integrate the information retrieved into a representation which meets the needs of the application and end users of the application.

Unfortunately, in many circumstances, the structure and content of the different databases being accessed may not be consistent. For example, there may be overlap in the information found across multiple databases (e.g., the same fields occur in more than one database). More troubling, however, is the situation where information is available in one data source, but not another. This complicates the task of accessing and correlating information across these databases since queries must be constructed that contend with this missing data (or "incomplete schema") problem.

One approach to this incomplete schema problem is to gather the data that is available from each of the databases and subsequently group the data together as desired, filling in the missing data from one database with data from another database, where possible. However, query languages like SQL are very rigid in their requirement that the schema (e.g., organization of data into fields or "entities" within the database) of the underlying database match all entities referenced by the query. Therefore, this approach conventionally requires a significant level of understanding of the underlying schema for each database and requires unique query statements to be written for each database to be queried.

Another approach to this incomplete schema problem involves "joining" multiple databases together based on common keys that would associate an item in one database with an item in another. However, this approach adds complexity to the query, which must include, not only predicates for data selection, but predicates and join logic for combining data from the multiple databases. This approach is also inefficient if the databases involved are large and distributed, as the (processing) cost of joining information from the large databases would be prohibitive.

Accordingly, there is a need for an improved method for issuing queries against multiple databases, particularly when the queries involve data missing from one or more of the databases.

SUMMARY OF THE INVENTION

The present invention provides improved methods, articles of manufacture, and systems for issuing a query against multiple databases that may not each contain all the fields involved in the query.

One embodiment provides a method for gathering data from one or more data sources. The method generally includes receiving, from a requesting entity, a query comprising at least two individual predicates involving one or more fields contained in the one or more data sources, decomposing the received query into the individual predicates, and for each data source, identifying one or more of the individual predicates involving fields contained in the data source, generating an effective query based on the identified individual predicates, and issuing the effective query against the data source.

One embodiment provides a method for issuing a query against one or more data sources. The method generally includes receiving a query involving at least one field not contained in at least a first one of the data sources, generating a first modified query by removing a portion of the received query involving the at least one field not contained in the first one of the data sources, and issuing the first modified query against the first one of the data sources. For example, the removed portion may include a first query predicate involving a field missing from the data source, as well as additional predicates logically related to the first query predicate through a logical AND operator.

One embodiment provides a computer-readable medium containing a program for gathering data from one or more data sources. When executed by a processor, the program performs operations generally including receiving, from a requesting entity, a query involving fields contained in one or more data sources, wherein at least one field involved in the query is not contained in at least a first one of the data sources, generating a first modified query by removing a portion of the received query involving the at least one field not contained in the at least first one of the data sources, and issuing the first modified query against the first one of the data sources.

One embodiment provides a data processing system including a requesting entity, one or more inhomogeneous data sources, and an executable component. The executable component is generally configured to receive a query from the requesting entity and, for each data source, determine if the received query involves one or more fields not contained in the data source, if so, modify the received query by removing a portion of the received query involving the one or more fields not contained in the data source and issue the modified query against the data source, and if not, issue the received query against the data source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2D are relational views of software components according to embodiments of the invention for issuing queries against one or more databases with incomplete schema.

DETAILED DESCRIPTION OF THE PREFERRED EMBODIMENTS

Figure 1:
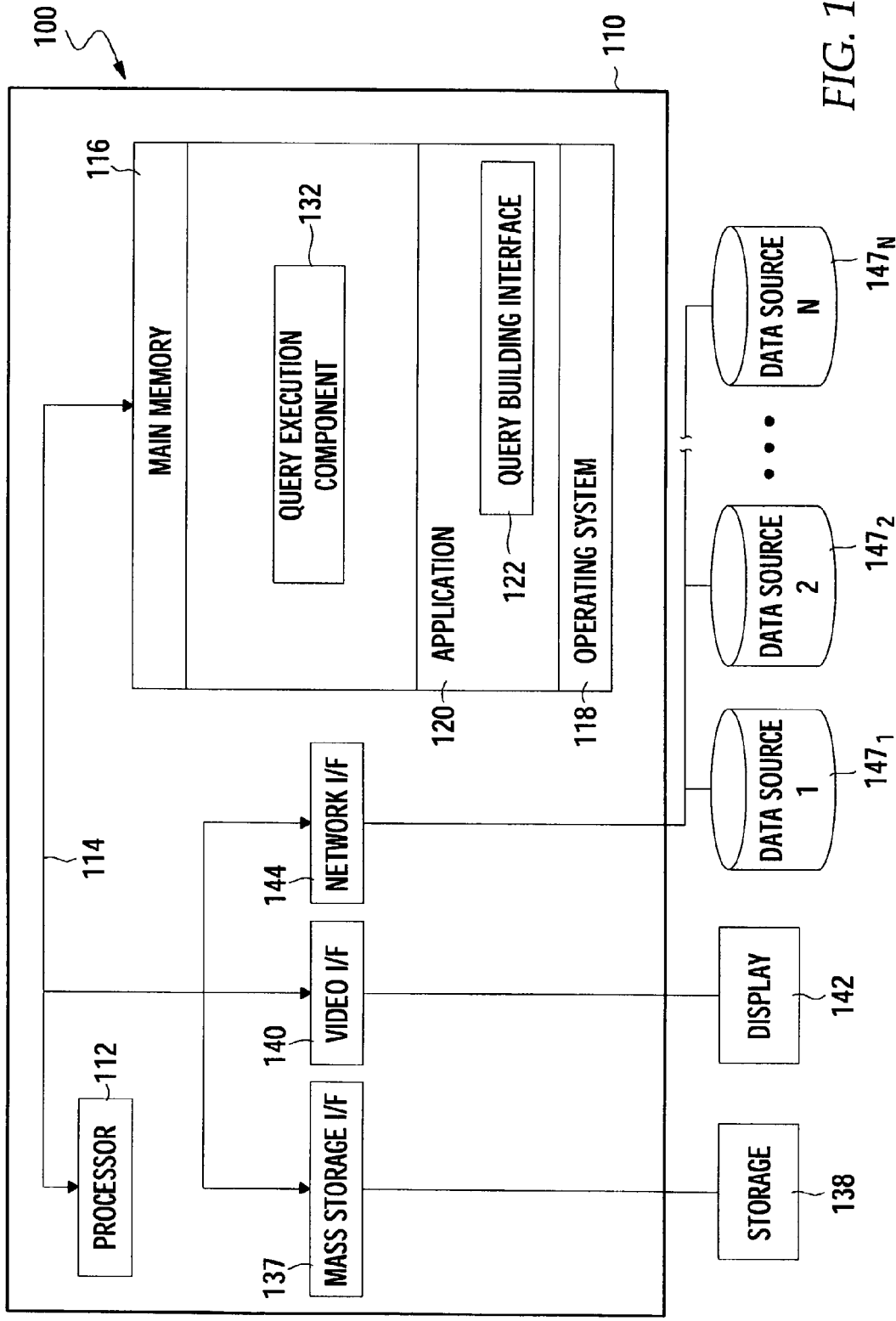
FIG. 1 is a computer system illustratively utilized in accordance with the invention.

The present invention generally is directed to a system, method, and article of manufacture for issuing a query against one or more data sources which may not each contain all the fields involved in the query. Such a query will be referred to herein as a "diverse query" as it may target a diverse group of distinct data sources that may contain unlike elements. For some embodiments, the diverse query may be decomposed into individual predicates (e.g., query conditions) which may be evaluated against each data source by determining, for each data source, if all the fields involved in the predicate are contained therein. Predicates involving fields not contained in a data source may be removed from the diverse query to generate an "effective query" that may be run against the data source to gather partial results therefrom. Partial results returned from issuing effective queries against a diverse group of data sources may then be combined according to any suitable technique.

As used herein, the term diverse query generally refers to a query that targets data resident on more than one diverse data source (e.g., inhomogeneous databases composed of distinct or unlike elements). The term effective query generally refers to a query generated for issuance against a particular data source by removing, from a diverse query, portions (e.g., specified query conditions or query results) involving fields not contained in the data source. If a data source contains all the fields involved in all the predicates, the effective query and diverse query for that data source may be the same. On the other hand, if a data source contains none of the fields involved in any of the predicates (or does not contain a field involved in a predicate that is related to all other predicates via a logical AND operator), an effective query may not be generated for that data source.

The term data source and database may be used interchangeably and generally refer to any collection of data, regardless of a particular physical representation (or "schema"). As used herein, the term schema generically refers to a particular arrangement of data. In other words, a database may be organized according to a relational schema (accessible by SQL queries), an XML schema (accessible by XML queries), or any other schema presently known or to be developed. Further, as used herein, when used in the context of a query, the terms run, executed, and issued may be used interchangeably.

An Exemplary Data Processing Environment

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

Referring now to FIG. 1, a database environment 100 is shown. In general, the data processing environment 100 includes a computer system 110 and a plurality of data sources $147_1$-$147_N$ (collectively data sources 147). The computer system 110 may represent any type of computer, computer system or other programmable electronic device, including a client computer, a server computer, a portable computer, an embedded controller, a PC-based server, a mini-computer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a storage device 138, by a video interface 140 operably connected to a display 142, and by a network interface 144 operably connected to a plurality of networked devices, such as the data sources 147. The storage device 138 may be any suitable storage device, such as a direct access storage device (DASD). The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX®, Microsoft Windows®, and the like. As illustrated, the memory 116 may further include at least one application program 120, which may include a query building interface 122 and a query execution component 132. The query execution component 132 may be a separate component, as shown, or may be integrated with the application 120.

In either case, the application 120 and the query execution component 132 are software products comprising a plurality of instructions that are resident at various times in various memory and storage devices in the computer system 110. When read and executed by one or more processors 112 in the computer system 110, the application 120 and the query execution component 132 cause the computer system 110 to perform the steps necessary to execute steps or elements embodying the various aspects of the invention. The application 120 (and more generally, any requesting entity, including the operating system 118) is configured to run (i.e., issue/execute) diverse queries against the data sources 147.

The queries issued by the application 120 may be created or specified by a user via the query building interface 122. For example, the issued queries may be generated in response to input from a user via the query building interface 122. Further, the issued queries may be selected from a list of previously generated queries a user has saved for reuse. In either case, the queries may be diverse queries that target data on more than one of the data sources 147. Diverse queries may be sent to the query execution component 132 for issuance. As previously described, one or more of the data sources 147 may not contain all of the fields involved in a diverse query. Therefore, in order to gather the data targeted by the diverse query, the query execution component 132 may generate, from the diverse query, a set of effective queries, each to be executed against a different corresponding one of the data sources 147.

An Exemplary Relational View

FIGS. 2A-2D illustrate a relational view of software components, including the application 120 and query execution 132, according to embodiments of the present invention. FIGS. 2A-2D may be described with reference to FIGS. 3A-3B which illustrate exemplary operations 300 that may be performed, for example, by the query execution 132.

The operations 300 begin, at step 302, by receiving a query involving fields contained in one or more data sources. For example, as illustrated, the query execution component 132 may receive, from the application 120, a diverse query 202 targeting data contained in three data sources 147 (for illustrative purposes, three data sources $147_1$, $147_2$, and $147_3$ are shown). The diverse query 202 may be generated, for example, using the query building interface 122 and may be in any suitable query language, such as SQL, XML, or any other type query language.

One example of an SQL representation of diverse query 202 is illustrated in Table I. As shown, the diverse query 202 may include a results field (line 002) and

TABLE I

| | DIVERSE QUERY EXAMPLE |
|---|---|
| 001 | SELECT |
| 002 | PATIENT_ID |
| 003 | WHERE |
| 004 | GENDER = 'FEMALE' AND |
| 005 | (DIAGNOSIS = 'LIVER DISEASE' OR |
| 006 | AST_TEST > 35) | various predicates (lines 004-006) involving fields contained in one or more of the data sources 147, such as PATIENT_ID, GENDER, DIAGNOSIS, and AST_TEST.

As illustrated, one or more of the data sources 147 (all three data sources, in this example) may not contain all the fields involved in the diverse query 202. For example, as illustrated, the first data source $147_1$ may contain diagnostic records $150_1$ with fields $156_1$ for PATIENT_ID, GENDER, and DIAGNOSIS, but not (AST) TEST_RESULTS. The second data source $147_2$ may contain test records $150_2$ with fields $156_2$ for PATIENT_ID, GENDER, and TEST_RESULTS, but not DIAGNOSIS, while the third data source $147_3$ may contain test records $150_3$ with fields $156_3$ for PATIENT_ID, GENDER, and AGE, but not TEST_RESULTS or DIAGNOSIS. Therefore, in order to gather all the data targeted by the diverse query 202, the query execution component 132 may perform operations to generate a set of effective queries 212 to issue against each of the data sources 147.

For example, at step 304, the diverse query is decomposed into individual predicates, while preserving logical operators (e.g., AND and OR) relating the predicates within the diverse query. At step 306, a loop of operations (308-310) is entered, to be performed for each data source 147, in an effort to gather data therefrom. At step 308, an effective query is generated for a selected one of the data sources 147, based on the individual predicates. The generation of effective queries, according to one embodiment of the present invention, is described in detail below, with reference FIG. 3B. As previously described, an effective query 212 for a particular data source 147 may be generated by modifying the diverse query to remove predicates (e.g., query conditions) involving missing fields and to supply suitable default values for missing query result fields.

For example, a first effective query $212_1$ to be issued against the first data source $147_1$ may be generated by removing portions of the diverse query 202 relating to test results, while a second effective query $212_2$ to be issued against the second data source $147_2$ may be generated by removing portions of the diverse query 202 relating to diagnoses. For this example, however, because the third data source $147_3$ does not contain fields for either TEST_RESULTS or DIAGNOSIS, it may not be possible to generate an effective query $212_3$ against the third data source $147_3$ (e.g., the effective query may be empty or assigned a NULL value). Therefore, at step 309, a determination is made as to whether the effective query is NULL. If the effective query is NULL, processing proceeds to step 306 to select a different data source 147, thus avoiding wasteful attempts to query data sources 147 that do not possibly contain query results.

Figure 2A:
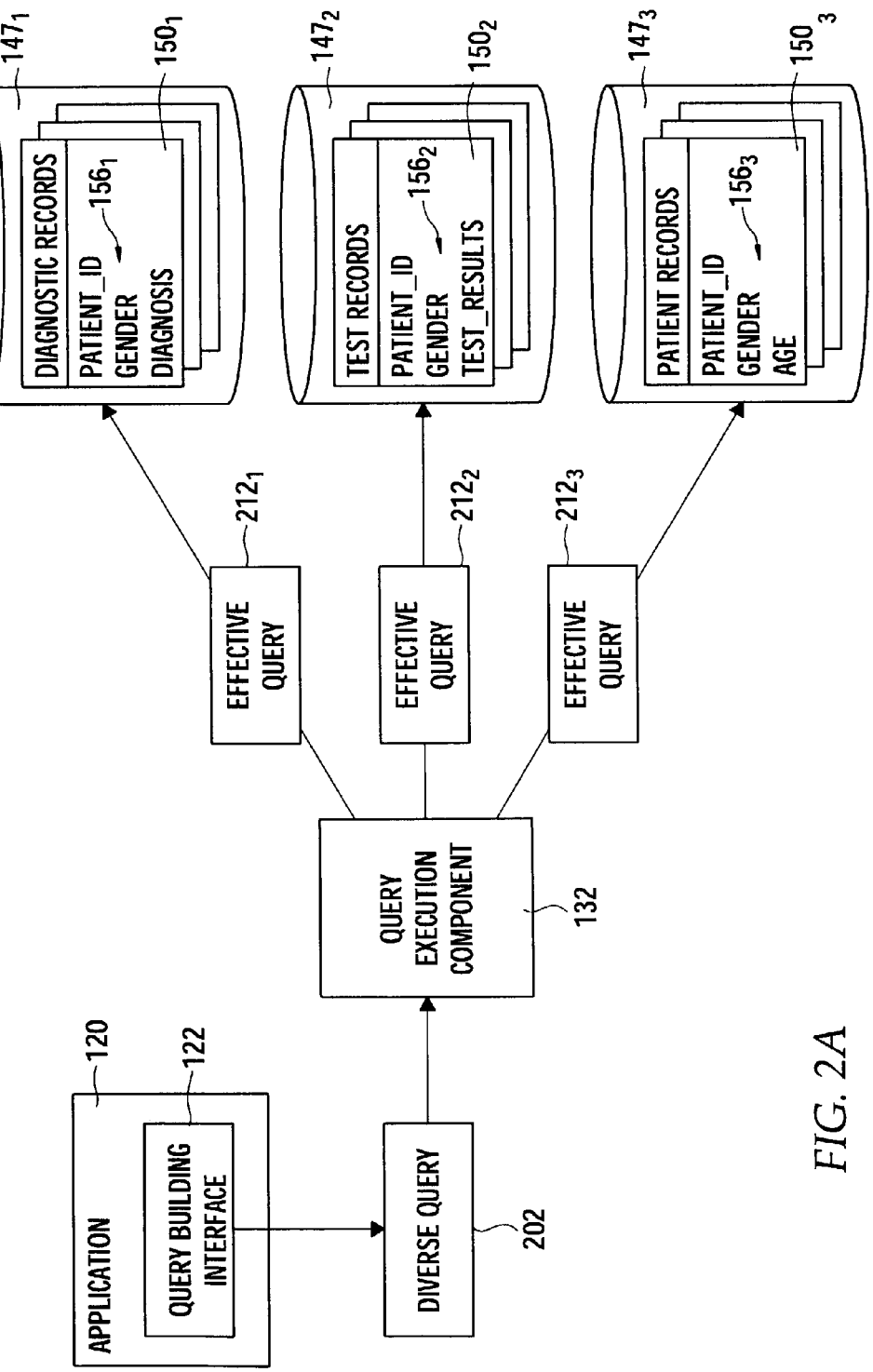
Figure 2B:
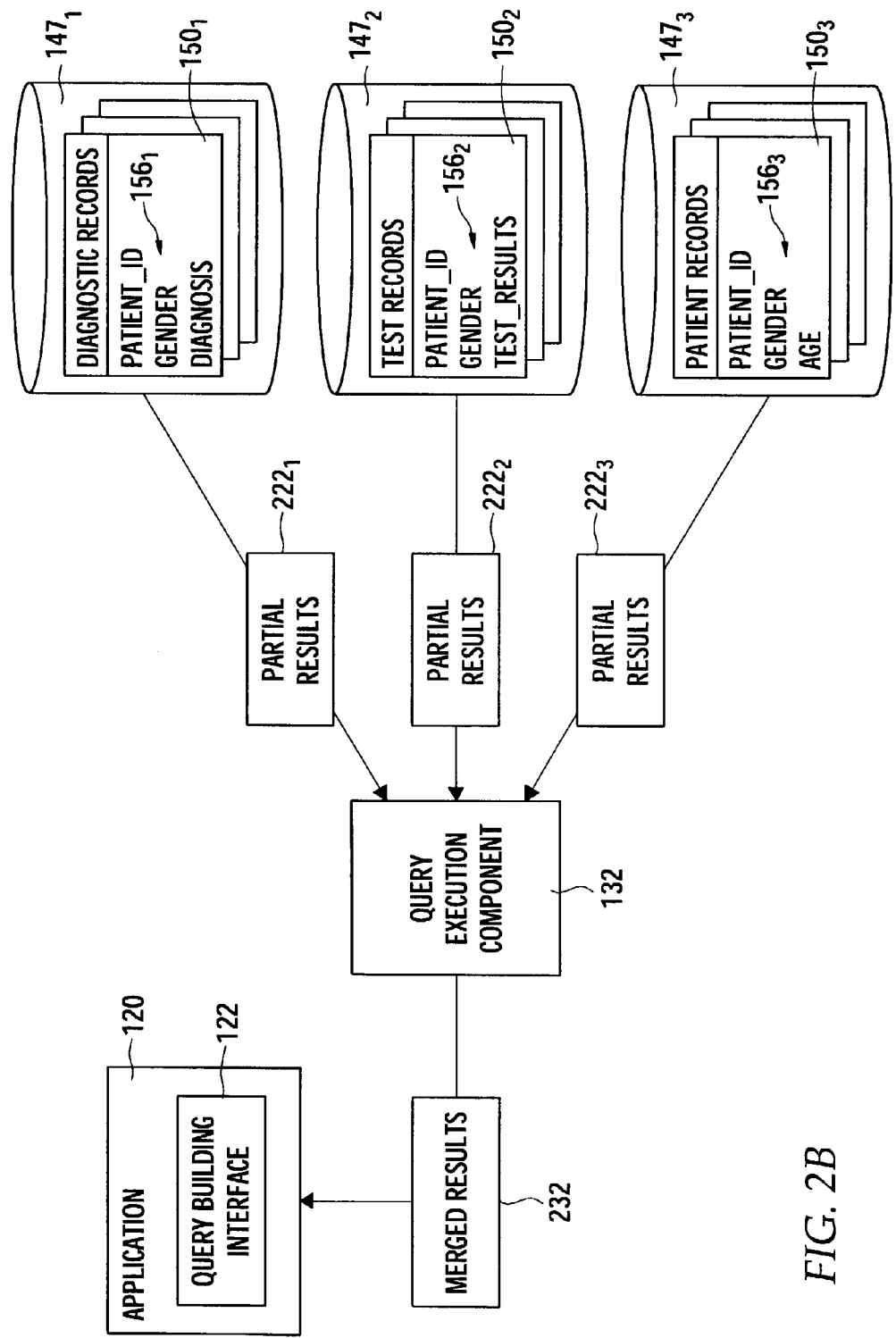
Figure 3A:
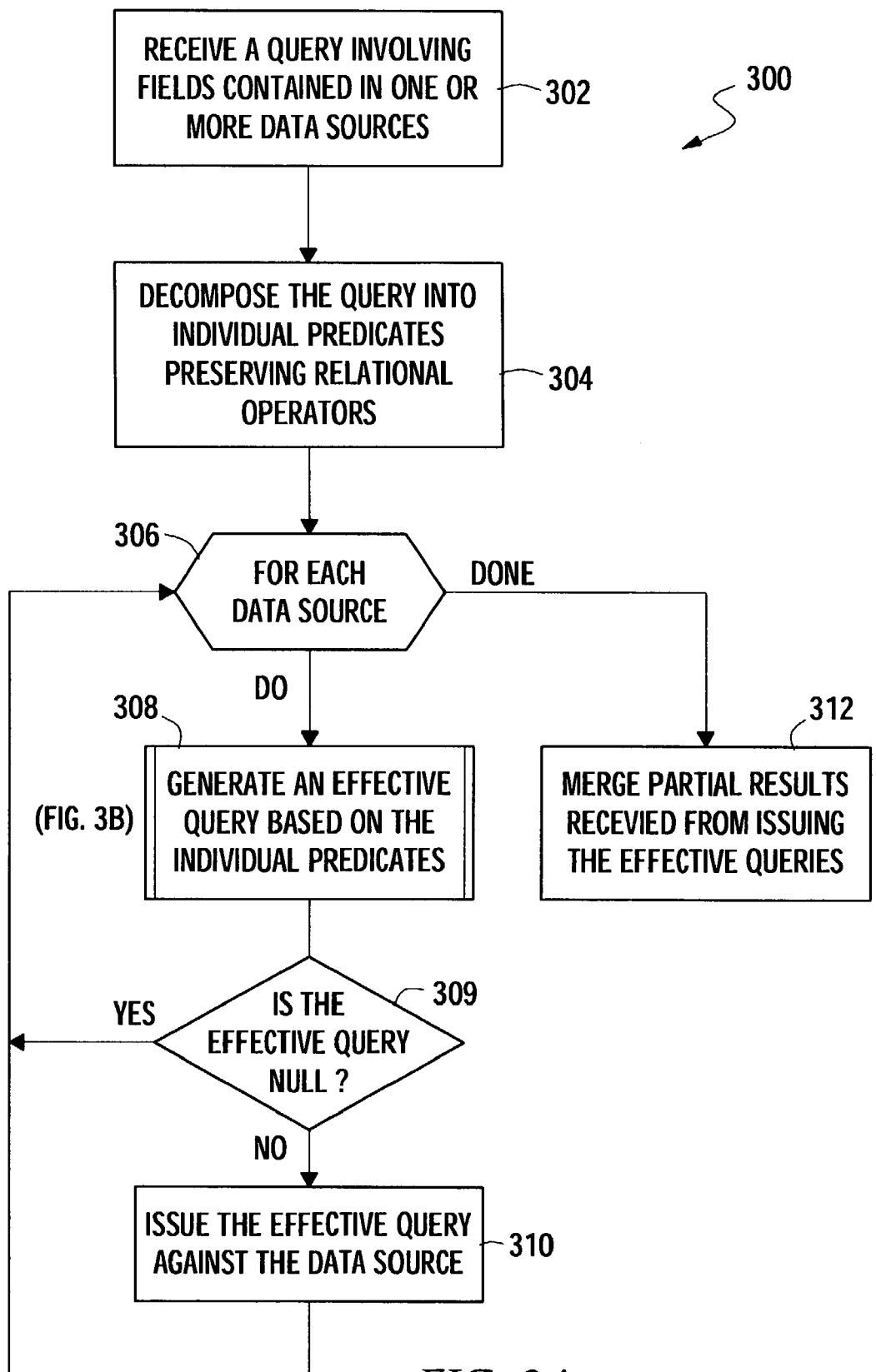
FIGS. 3A and 3B are flow charts illustrating exemplary operations of a runtime component.

If, on the other hand, the effective query is not NULL, processing proceeds to step 310, where the effective query is issued against the selected data source 147. While the operations 300 show effective queries issued after generation (e.g., within the loop of operations 306-310), for some embodiments, effective queries for all of the data sources 147 may be generated prior to issuing any effective queries. Regardless, as illustrated in FIG. 2B, the query execution component 132 may receive, in response to the effective queries, partial results 222 from each of the data sources 147. Once the operations 308-310 have been performed for each of the data sources 147, the partial results 222 received therefrom may be merged, at step 312.

As illustrated, the query execution component 132 may merge the partial results 122 (to generate merged results 232), and send the merged results 232 to the application 120. The query execution component 132 may be configured to merge the partial results according to any suitable techniques or combination of techniques, which may depend on the format of the individual data sources 147. As an example, if the partial results 222 from each data source 147 contain a consistent set of the same fields, the partial results may be merged with a standard UNION operation.

This scenario may be illustrated by considering the example described above, where each of the partial results 222 may contain a single field PATIENT_ID. In other words, the partial results $222_1$ received from the first data source $147_1$ may contain identifications (IDs) for all female patients diagnosed with liver disease, while the partial results $222_2$ received from the second data source $147_2$ may contain IDs for all female patients whose AST test results exceed 35. Therefore, the merged results 232 may include IDs for all female patients who are either diagnosed with liver disease, whose AST test results exceed 35 (or both), thus satisfying the conditions of the original diverse query. The query execution component 132 may also be configured to perform other operations, such as removing redundant entries, for example, if the same patient ID is returned in each set of patient results $222_1$ and $222_2$ (e.g., a female patient with liver disease and AST test results in excess of 35). Such redundant entries may also be avoided by merging the partial results 222 with an INTERSECTION operation which, in this case, would only return patient IDs found in each data source 147 queried.

In some instances, however, fields specified as query results may be missing from one or more of the data sources 147, which may complicate or prevent conventional merging of partial results. For example, query languages, such as SQL, may require records to have consistent (i.e., identical) before the records may be merged (e.g., with a UNION operation). Therefore, in such instances, in an effort to ensure the partial results 222 returned from each data source 147 contain consistent fields, corresponding effective queries 132 may be modified to specify a default value (e.g., NULL) to return as results for fields not contained in the data source. For example, one or more of the effective queries 132 may be modified to return "AS NULL" data for fields that are missing from a corresponding data source 147, to ensure the partial results 222 returned from each data source 147 are consistent, allowing the use of a conventional merge operations. For some embodiments, rather than a conventional merge, the query execution component 132 may be configured to perform custom merging. For example, based on a common field, such as a patient ID, the query execution 132 may fill in data missing from partial results 222 returned from one data source with data provided in partial results 222 returned from another data source containing the missing data.

Generating an Effective Query

Figure 3B:
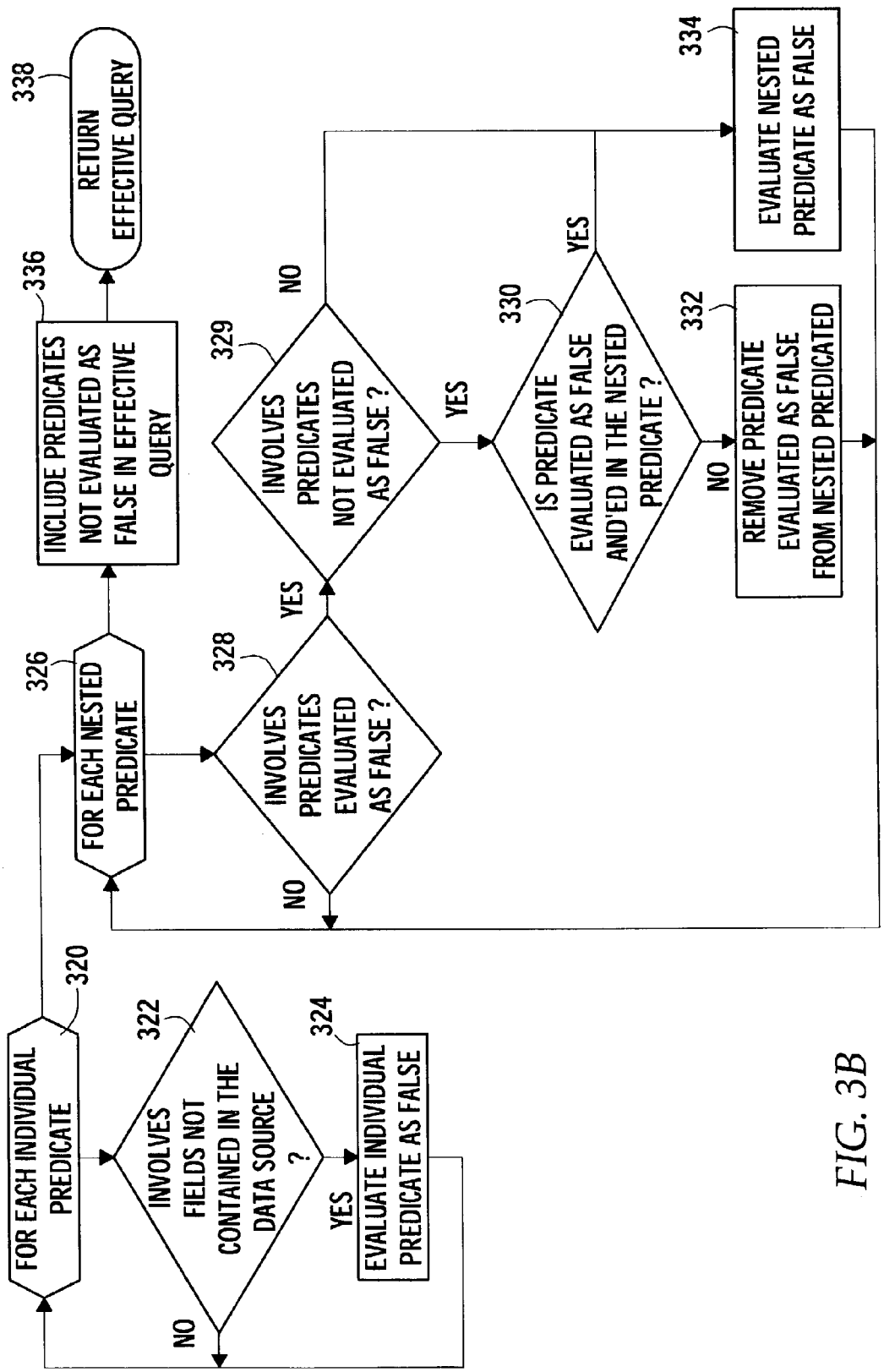
Figure 4A:
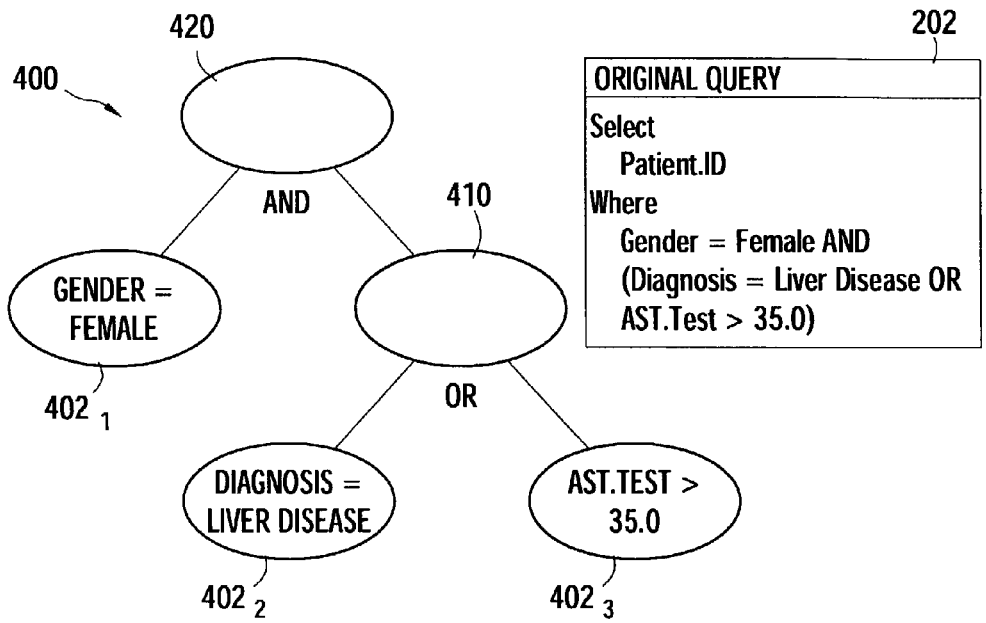
FIGS. 4A-4D illustrate one technique for generating effective queries according to one embodiment of the present invention.

FIG. 3B illustrates exemplary operations 320 that may be performed to generate an effective query (i.e., from the original "diverse" query) for a particular data source. It is assumed that, prior to performing the operations 320, the diverse query has been decomposed into individual predicates. The operations 320 may best be described with reference to FIGS. 4A-4D which illustrate the generation of effective queries against different data sources utilizing a hierarchical query tree structure 400 (hereinafter "tree 400") of the individual predicates of the diverse query shown in TABLE I. For example, FIG. 4A illustrates the original query, where the individual predicates occupy leaf nodes $402_{1\text{-}3}$ of the query tree 400. Nodes of the query tree are connected via the relational operators (e.g., AND, OR, etc.) of the query, thereby forming nested predicates.

The operations 320 generally consist of two loops of operations. The first loop of operations (321-324) identifies which individual predicates involve missing data (i.e., fields that are not contained in the data source). The second loop of operations (326-334) determines the effect these individual predicates involving missing data have on the rest of the query.

The first loop of operations, entered at step 321, is performed for each individual predicate. At step 322, a determination is made as to whether an individual predicate involves fields not contained in the data source. Any suitable technique may be utilized to determine if a data source 147 contains all the fields involved in a predicate. As an example, a list of fields (e.g., columns in a relational database) contained in the data source may be extracted from metadata obtained through common call level interfaces, such as the Open Database Connectivity (ODBC) and Java Database Connectivity (JDBC™) call level interfaces.

Figure 2C:
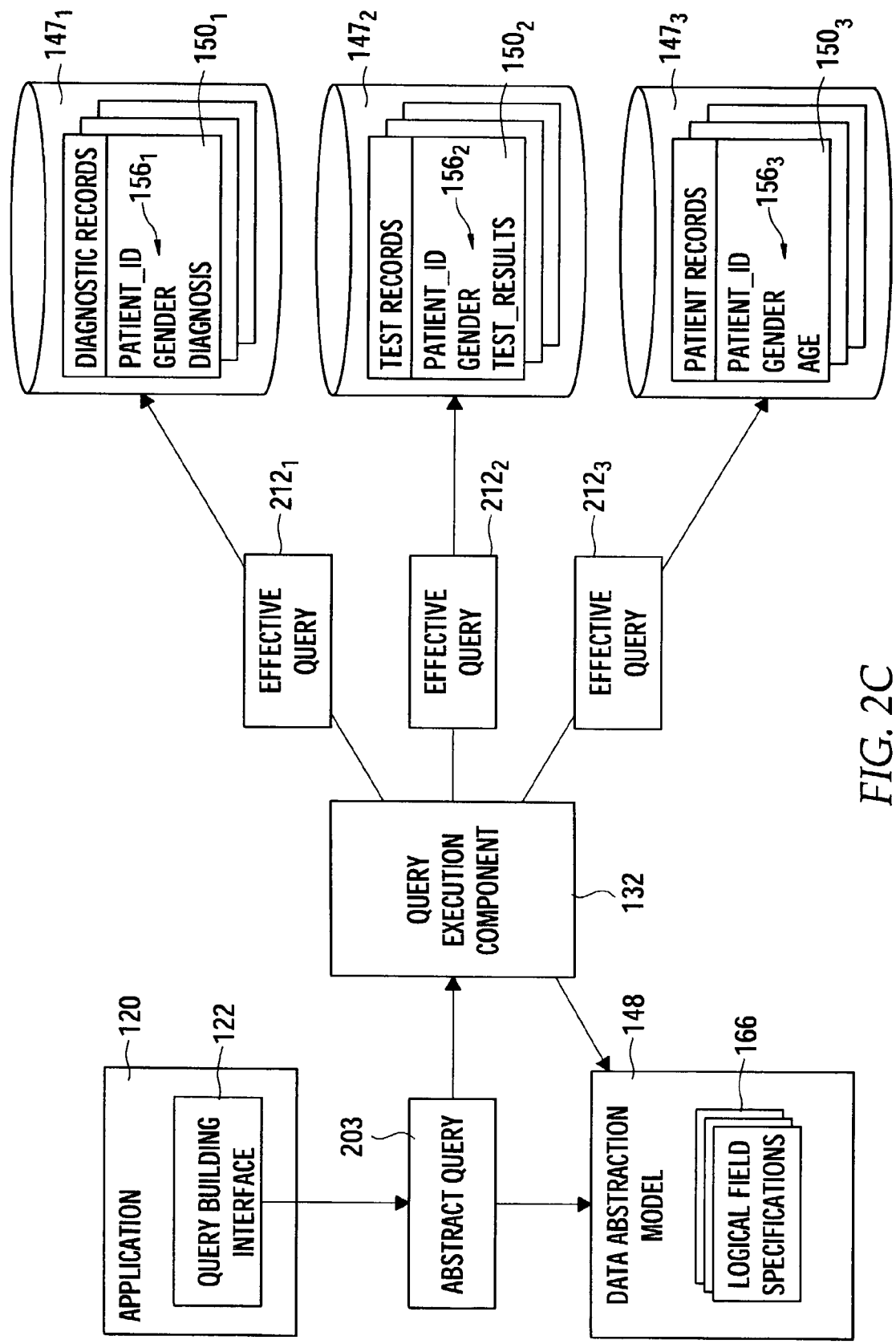

As an alternative, fields contained in a data source 147 may be determined by examining a data abstraction model containing abstract representations of the fields in the data source 147. For example, as illustrated in FIG. 2C, a data abstraction model 148 may contain abstract representations, shown as a set of logical field specifications 166, that map logical fields to fields in the data sources 147. The data abstraction model 148 may allow a user to generate an abstract query 203 (e.g., via the query building interface 122) based on the logical fields without extensive knowledge of the underlying data sources 147. The query execution component 132 may then map the logical fields of the abstract query 203 to physical fields of the data sources 147 based on the information contained in the logical field specifications 166.

For example, as illustrated in FIG. 2D, logical field specifications $166_{1\ldots3}$ may indicate the physical field (e.g., by table and column name) to which a corresponding logical field is mapped, as well as the data source 147 in which it is contained. Thus, the logical field specifications 166 may be examined to determine if a particular logical field involved in an abstract query 203 is contained in a particular data source 147. The concepts of data abstraction models and abstract queries are described in greater detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

Regardless of how it is determined whether a data source 147 contains logical fields involved in an individual predicate (e.g., via metadata or from a data abstraction model), if the individual predicate involves fields that are not contained in the data source (i.e., data required to evaluate the predicate is missing from the data source), the individual predicate is evaluated as false (hereinafter referred to as a "false predicate"), at step 324.

Figure 4B:
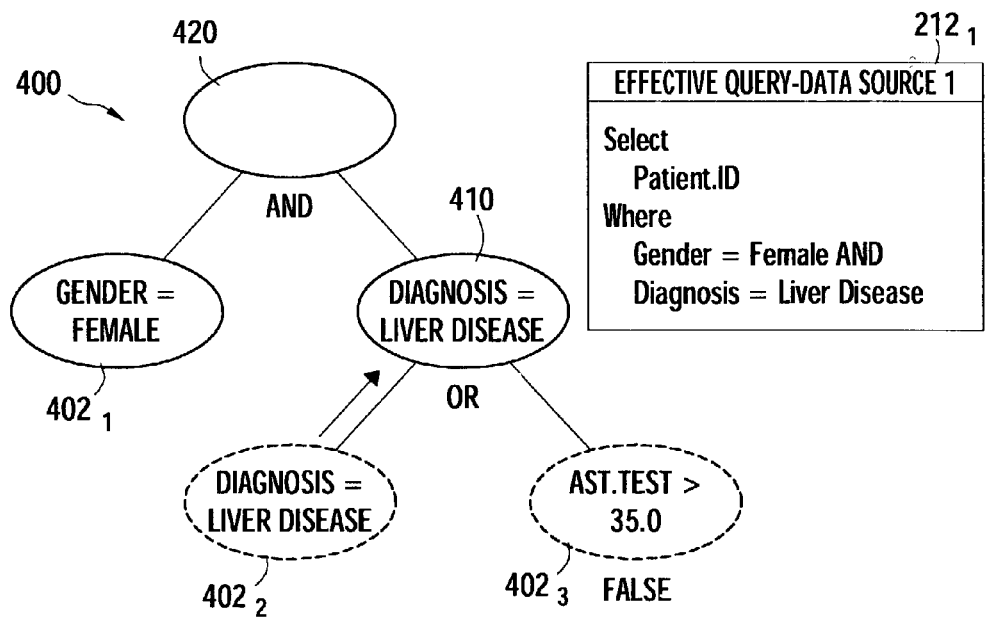
Figure 4C:
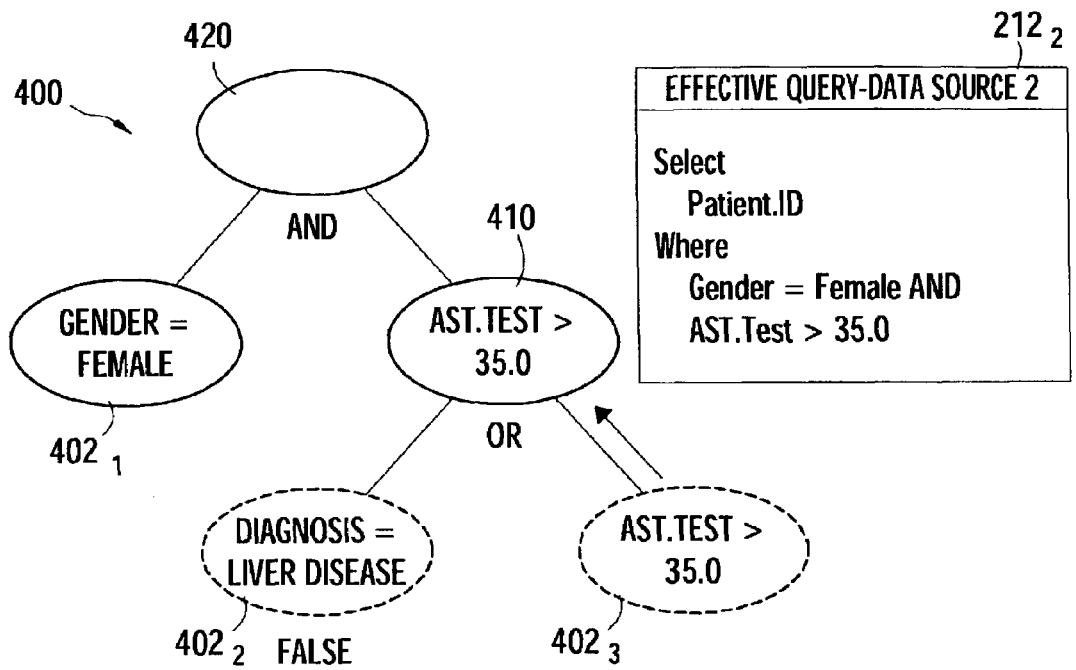
Figure 4D:
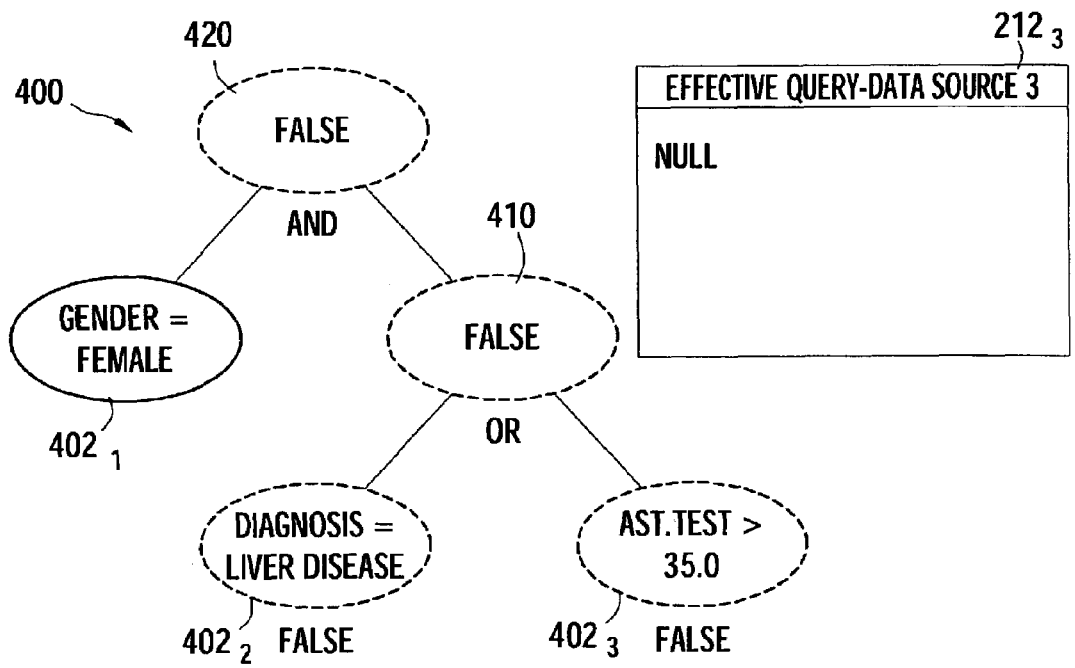

The results of evaluating the individual predicates against each data source 147 may be captured in the query tree 400, which may then be utilized to evaluate individual predicates against the data source for which the effective query is being built by traversing the leaf nodes $402_{1-3}$. As illustrated in FIG. 4B, because the first data source $147_1$ does not contain (AST) test results, the predicate 'AST_TEST>35' is a false predicate with respect to the first data source $147_1$ and, therefore, node $402_3$ may be assigned a value of false. Similarly, as shown in FIG. 4C, because the second data source $147_2$ does not contain diagnoses, the predicate 'DIAGNOSIS=LIVER DISEASE' is a false predicate with respect to the second data source $147_2$ and node $402_2$ may be assigned a value of false. As shown in FIG. 4D, because the third data source $147_3$ does not contain either diagnoses or test results, both these predicates are false predicates with respect to the third data source $147_3$. and, therefore, both nodes $402_2$ and $402_3$ may be assigned a value of false.

Once each individual predicate is evaluated against the data source (for which the effective query is being generated), processing continues to the second loop of operations (operations 328-334), entered at step 326. The second loop of operations are performed for each nested predicate in the query, to determine the effect of false predicates thereon. As used herein, the term nested predicate generally refers to any set of two or more predicates related by a relational operator. The two or more predicates may be any combination of individual predicates or nested predicates. For example, referring back to FIG. 4A, a first nested predicate, represented by node 410, includes the individual predicates of nodes $402_2$ and $402_3$ ('DIAGNOSIS=LIVER DISEASE' and 'AST_TEST>35', respectively) related by an OR relational operator. A second nested predicate, represented by root node 420, involves the first nested predicate represented by node 410, and the individual predicate 'GENDER=FEMALE' related by an AND operator.

At step 328, a determination is made as to whether a selected nested predicate involves predicates (individual or nested) that evaluated as false. If the nested predicate does not involve false predicates (i.e., the data source contains all the fields involved in the nested predicate) and processing returns to step 326 to select the next nested predicate. If the nested predicate does involve a false predicate, processing proceeds to step 329, to determine if the nested predicate involves any predicates that have not been evaluated as false.

If the nested predicate involves at least one predicate that is not evaluated as false, in addition to a false predicate, a determination is made, at step 330, as to whether the false predicate is related to all other predicates in the nested query by an AND operator. If the false predicate is not related to all other predicates in the nested predicate via an AND operator, the nested predicate may still evaluate properly against the data source, by removing, at step 332, the false predicate (as well as other predicates related to the false predicate via an AND operator).

One example of this processing may be illustrated by considering an example of a nested predicate containing three predicates A, B, and C, related via the following logic: "(A AND B) OR C." If predicate B has been evaluated as a false predicate against a given data source 147, not only should predicate B be removed from the query, but predicate A, as well, since predicate A is related to predicate B via an AND operator. However, as predicate C is related to the false predicate B via an OR operator, predicate C may still evaluate properly.

Another example of this scenario is illustrated in FIG. 4B. While the predicate 'AST_TEST>35' is a false predicate with respect to the first data source $147_1$, because it is OR'd in the nested predicate ('AST_TEST>35' OR 'DIAGNOSIS=LIVER DISEASE'), it may be removed from the nested predicate. The removal of the individual predicate 'AST_TEST>35' is illustrated in FIG. 4B by moving the individual predicate 'DIAGNOSIS=LIVER DISEASE' up in the tree 400 into the node 410. Therefore, in the next pass through the loop, the nested predicate represented by root node 420 is evaluated as effectively including the individual predicates of node $402_1$ ('GENDER=FEMALE') and node 410 ('DIAGNOSIS=LIVER DISEASE'). As neither predicate has evaluated as false, processing returns to step 326.

As there are no more nested predicates, processing proceeds to step 336, where predicates not evaluated as false are included in the effective query. Therefore, as shown in FIG. 4B, the effective query $212_1$ for the first data source $147_1$ includes the predicates 'GENDER=FEMALE' AND 'DIAGNOSIS=LIVER DISEASE,' with the predicate that evaluated false with respect to the first data source $147_1$ ('AST_TEST>35') effectively removed. As illustrated in FIG. 4C, a similar result is achieved when generating an effective query $212_2$ against the second data source $147_2$. In other words, the effective query $212_2$ includes the individual predicates 'GENDER=FEMALE' and 'AST_TEST>35', with the predicate that evaluated false with respect to the second data source $147_2$ ('DIAGNOSIS=LIVER DISEASE') effectively removed.

Referring back to step 329, if the nested query involves only predicates evaluated as false, the nested predicate is also evaluated as false (regardless of the logical operator relating the false predicates), at step 334. An example of this scenario is illustrated in FIG. 4D, where both individual predicates involved in the nested predicate represented by node 410 are evaluated as false against the third data source $147_3$. As illustrated, because the nested predicate represented by node 410 is evaluated as false and node 410 is AND'ed with node $402_1$, the next time through the loop, the nested predicate represented by the root node 420 is evaluated as false. Thus, the effective query $212_3$ for the third data source $147_3$ is NULL.

Regardless of the particular contents, the effective query 212 is returned, at step 338, to be issued against the corresponding data source 147 for which it was generated. Partial results 222 returned in response to issuing the effective query 212 against the corresponding data source 147 may be merged with other partial results 222 returned in response issuing other effective queries 212 against other corresponding data sources 147, as previously described.

CONCLUSION

Query languages typically require that a data source contain all the fields involved in a query in order for the query to issue against the data source. However, aspects of the present invention, provide techniques for issuing a query against one or more data sources that do not contain all the fields involved in the query. Effective queries may be automatically generated for each of the data sources by modifying the original query to effectively remove the involvement of the missing fields. In response to issuing effective queries against their corresponding data sources, partial results may be returned, which may be merged using any suitable technique.

While the foregoing is directed to embodiments of the present invention, other and further embodiments of the invention may be devised without departing from the basic scope thereof, and the scope thereof is determined by the claims that follow.

What is claimed is:

1. A method for gathering data from one or more data sources comprising:
   receiving, from a requesting entity, a query comprising at least two individual predicates involving one or more fields contained in the one or more data sources;
   decomposing the received query into the individual predicates; and
   for each data source,
      identifying one or more of the individual predicates involving fields contained in the data source,
      generating an effective query based on the identified individual predicates, and
      issuing the effective query against the data source.

2. The method of claim 1, wherein:
   the one or more data sources are modeled by a data abstraction model containing abstract representations of fields contained in the data sources; and
   identifying one or more of the individual predicates involving fields contained in the data source comprises examining the abstract representations contained in the data abstraction model.

3. The method of claim 1, wherein identifying one or more of the individual predicates involving fields contained in the data source comprises gathering metadata from the data source.

4. The method of claim 1, wherein generating an effective query based on the identified individual predicates comprises removing, from the received query, individual predicates that involve fields that are not contained in the data source.

5. The method of claim 4, wherein generating an effective query based on the identified one or more of the individual predicates further comprises removing, from the received query, one of more of the identified individual predicates logically related, via an AND operator, to an individual predicate that involves fields that are not contained in the data source.

6. The method of claim 1, further comprising:
   receiving first partial results from a first one of the data sources, in response to issuing a first effective query against the first one of the data sources;
   receiving second partial results from a second one of the data sources, in response to issuing an effective query against the second one of the data sources; and
   merging the first and second partial results to generate merged results; and
   returning the merged results to the requesting entity.

7. The method of claim 6, wherein the first and second partial results do not contain identical fields.

8. The method of claim 6, wherein at least one of the first and second partial results contain predefined data returned for a field not contained in the first or second data source.

9. A method of issuing a query against one or more data sources, comprising:
   receiving a query involving at least one field not contained in at least a first one of the data sources;
   generating a first modified query by decomposing the received query into individual predicates and removing from the received query predicates involving the at least one field not contained in the first one of the data sources; and
   issuing the first modified query against the first one of the data sources.

10. The method of claim 9, wherein the predicates removed from the received query comprises at least a first predicate involving the at least one field not contained in the first one of the data sources and at least a second predicate involving at least one field contained in the first one of the data sources, wherein the first and second predicates are logically related by an AND operator.

11. The method of claim 9, further comprising:
    generating a second modified query by removing a portion of the received query involving at least one field not contained in a second one of the data sources; and
    issuing the second modified query against the second one of the data sources.

12. A computer-readable medium containing a program which, when executed by a processor, performs operations comprising:
    receiving, from a requesting entity, a query involving fields contained in one or more data sources, wherein at least one field involved in the query is not contained in at least a first one of the data sources;
    generating a first modified query by decomposing the received query into individual predicates and removing, from the received query, predicates involving the at least one field not contained in the at least first one of the data sources; and
    issuing the first modified query against the first one of the data sources.

13. The computer-readable medium of claim 12, wherein the generating the first modified query comprises:
    identifying individual predicates involving fields contained in the first one of the data sources; and
    including at least some of the identified individual predicates in the modified query.

14. The computer-readable medium of claim 13, wherein the generating the first modified query further comprises removing at least one of the identified individual predicates from the received query.

15. The computer-readable medium of claim 12, wherein the operations further comprise:
    receiving partial results from the first one of the data sources in response to issuing the first modified query;
    issuing a second query against a second one of the data sources;
    receiving results from the second one of the data sources in response to issuing the second query; and
    merging the partial results received in response to issuing the first modified query with the results received in response to issuing the second query.

16. The computer-readable medium of claim 15, wherein the operations further comprise generating the second query by removing a portion of the query involving at least one field not contained in the second one of the data sources.

17. The computer-readable medium of claim 15, wherein the results received from the first one of the data sources in response to issuing the first modified query contains different fields than the results received from the second one of the data sources in response to issuing the second query.

18. A data processing system, comprising:
a requesting entity;
one or more inhomogeneous data sources; and
an executable component configured to receive a query from the requesting entity and, for each data source,
determine if the received query involves one or more fields not contained in the data source,
if so, modify the received query by decomposing the received query into individual predicates and removing from the received query predicates involving the one or more fields not contained in the data source and issue the modified query against the data source, and
if not, issue the received query against the data source.

19. The data processing system of claim 18, further comprising a data abstraction model containing abstract representations of fields contained in the inhomogeneous data sources.

20. The data processing system of claim 19, wherein the executable component is configured to determine if the received query involves one or more fields not contained in the data source by examining the data abstraction model.

21. The data processing system of claim 18, wherein the executable component is further configured to:
receive results from each of the data sources, in response to issuing at least one of a modified query or the received query against each data source;
merge the results received from each data source; and
send the merged results to the requesting entity.

22. The data processing system of claim 18, wherein the results received from at least two of the data sources contain different fields.

* * * * *